United States Patent [19]

Bargenda

[11] 3,982,502
[45] Sept. 28, 1976

[54] IGNITION SYSTEM FOR A ROTARY PISTON COMBUSTION ENGINE

[75] Inventor: Siegfried Bargenda, Weinsberg, Germany

[73] Assignees: Audi NSU Auto Union Aktiengellschaft, Neckarsulm, Wurtt; Wankel GmbH, Lindau, Bodensee, both of Germany

[22] Filed: Mar. 6, 1975

[21] Appl. No.: 555,790

[30] Foreign Application Priority Data

Mar. 16, 1974 Germany............................ 2412772

[52] U.S. Cl. .......................... 123/8.09; 123/148 DS; 123/148 C
[51] Int. Cl.² ......................................... F02B 53/12
[58] Field of Search............ 123/8.09, 8.05, 148 DS, 123/148 C, 117 R

[56] References Cited
UNITED STATES PATENTS

| | | |
|---|---|---|
| 1,862,116 | 6/1932 | Hicks............................ 123/148 DS |
| 2,367,023 | 1/1945 | Horton.......................... 123/148 DS |
| 3,168,891 | 2/1965 | Cook ............................ 123/148 DS |
| 3,534,717 | 10/1970 | Froede.............................. 123/8.05 |
| 3,626,909 | 12/1971 | Hayashida.......................... 123/8.05 |
| 3,773,024 | 11/1973 | Ortiz............................ 123/148 DS |
| 3,809,042 | 5/1974 | Hosho............................ 123/148 DS |

*Primary Examiner*—Clarence R. Gordon
*Attorney, Agent, or Firm*—Kane, Dalsimer, Kane, Sullivan and Kurucz

[57] ABSTRACT

An ignition system for a four-stroke rotary piston combustion engine of the trochoid type. The casing of the engine has an inner chamber bounded by a jacket with dual arc inside contour through which an eccentric shaft with an eccentric passes. A triangular piston is rotatably mounted on said eccentric shaft. Two or more spark plugs are fitted in the jacket near the shaft and the spark plugs are connected to their own ignition generator in an ignition system. There are different ignition systems for the individual spark plugs.

4 Claims, 1 Drawing Figure

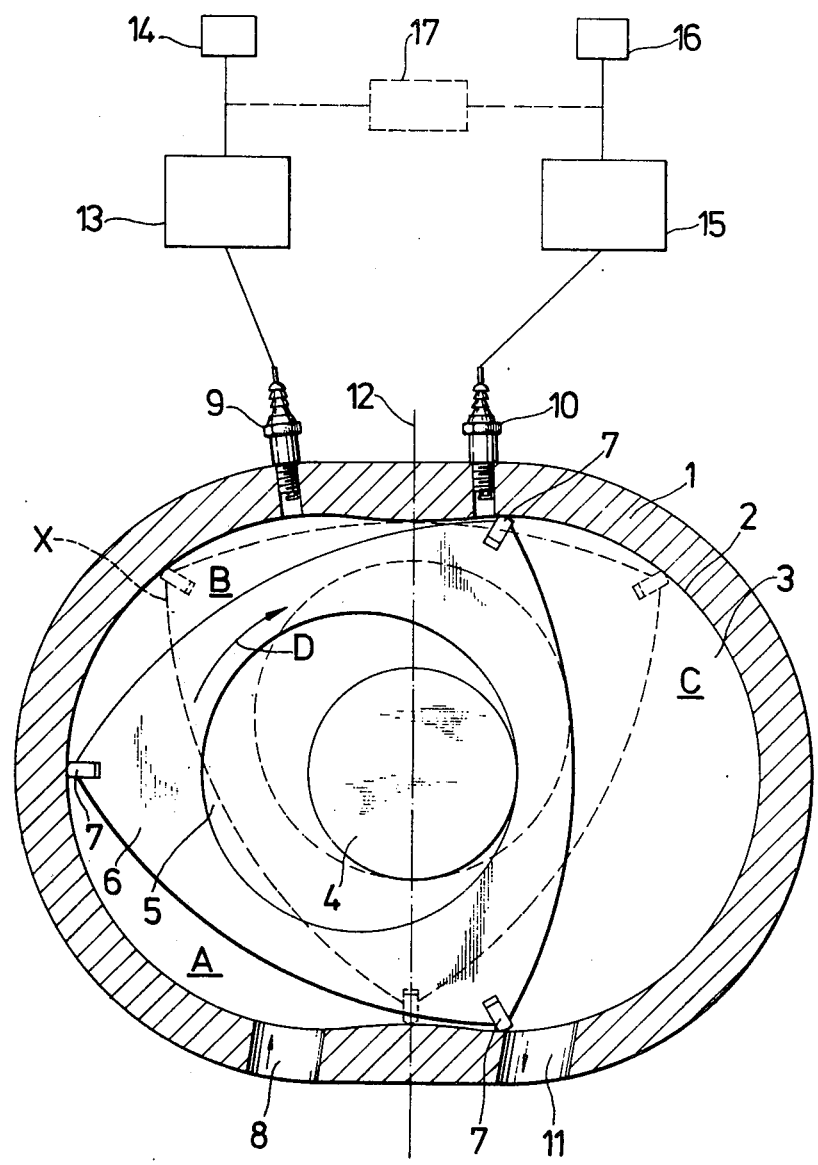

IGNITION SYSTEM FOR A ROTARY PISTON COMBUSTION ENGINE

BACKGROUND OF THE INVENTION

The invention relates to an ignition system for a four-stroke rotary piston combustion engine of the trochoid type. The shell of the engine has an inner chamber bounded by a mantle with dual-arc inside contour through which an eccentric shaft with an eccentric passes. A triangular piston is rotatably mounted on the eccentric shaft. Two or more spark plugs are fitted in the mantle in the area near the shaft and the spark plugs are connected to their own ignition generator in an ignition system.

In rotary piston combustion engines of the above type there is a relatively elongated combustion chamber at the time of ignition, due to the sickle-shaped configuration of the working chamber. This combustion chamber shape may make complete combustion of the gases difficult. By using several spark plugs which ignite simultaneously or sequentially, conventional ignition systems aim to prevent a dragging and incomplete combustion of the aspired gases and thus to reduce the initially caused high specific fuel consumption as well as the amount of harmful ingredients in the exhaust gas. One of the well-known supplementary measures is to provide a control system that causes ignition of the individual spark plugs at different times. This measure may make a marked improvement in the temporal course of the combustion. It has been found, however, that in conventional ignition systems the usual coil ignition, of which the ignition spark has a long burning duration and which therefore improves the ignition of the gas — which is a particular advantage under idling and partial-load operation — will fail to perform properly if soot deposits on the spark plugs from the normally soot laden environment. In addition, coil ignition may occasionally miss at high rotation speeds. Magneto ignition systems, which are also quite well known, exhibit similar characteristics. The high-voltage capacitor ignition system — which is also used — on the other hand, ensures satisfactory ignition immediately after engine start, under conditions of hot running, and at high rotation speeds in a rotary piston combustion engine, even if the spark plugs are soot-laden. The reason for this is the fast voltage rise speed and the powerful ignition voltage pulse of these ignition systems. It is a definite advantage. However, the use of such an ignition system may be relatively expensive in cases where several spark plugs are employed in a rotary piston combustion engine in conjunction with a highvoltage capacitor ignition system. It is therefore evident that in a rotary piston combustion engine equipped only with a single specific ignition system, the advantages resulting from such a system are necessarily coupled with restrictions with respect to the ignition performance which, in turn, may affect adversely the combustion process in certain operating ranges.

SUMMARY OF THE INVENTION

The aim of the invention is to create an ignition system for rotary piston combustion engines of the kind described above that ensures optimum ignition and combustion of the mixture in all operating modes.

According to the invention this aim is realized by employing different ignition systems for the individual spark plugs. By following the provisions of the invention we are able to ensure reliable ignition in all operating modes by utilizing certain properties of the various conventional ignition systems.

In a rotary piston combustion engine equipped with spark plugs before and after the short shaft along the rotation direction of the piston, the spark plugs mounted before the short axis (minus position) may be connected to an ignition system that creates a long spark tail, and the spark plugs mounted after the short axis (plus position) may be connected to an ignition system that creates a high voltage rise speed. The well-known advantage of favorable ignitability of the charge with an ignition system that creates a long spark tail may thus provide advantages under idling and low-load conditions, while an ignition system that creates a high voltage rise speed may provide advantages under starting and hot-run conditions, as well as operation at high rotation speeds.

A preferred embodiment using two spark plugs mounted sequentially along the rotation direction of the piston may use a spark plug located before the short axis, connected to a conventional coil ignition system, and a spark plug located after the short axis, connected to a conventional highvoltage capacitor ignition system. Such a design and a combination of two conventional ignition systems will result in a particularly favorable ignition of the charge since the coil ignition system provides a long spark tail and the high voltage capacitor ignition system provides a high voltage rise speed for the ignition of the mixture.

Another embodiment is also possible. It connects the spark plug mounted before the short axis to a conventional transistor ignition system and the spark plug mounted after the short axis to a high-voltage capacitor ignition system. Since the transistor ignition system differs from the so-called coil ignition system only in the primary circuit, one may use this system — which also creates a long spark tail and a high voltage rise speed — for the ignition of the mixture and for obtaining favorable inflammability of the charge.

According to another suggestion it is also possible to connect the spark plug mounted before the short axis to a conventional magneto ignition system and the spark plug mounted after the short axis to a high-voltage capacitor ignition system. This solution may be appropriate in cases where the use of a magneto ignition system appears desirable in the combustion engine for certain applications. In this case, too, the long spark tail created by the magneto ignition system and the high voltage rise speed created by the high-voltage capacitor ignition system contribute to the ignition of the mixture.

Improved combustion of the fuel-air mixture can be achieved at all operating ranges by combining various conventional ignition systems, resulting in a reduction in specific fuel consumption and in the emission of unburned gases, as well as an increase in operational reliability and performance. In addition, the ignition system may be built in a cost-effective manner because of the differences in manufacturing costs.

BRIEF DESCRIPTION OF THE DRAWING

We shall now describe an embodiment of the invention on the basis of the drawing, which illustrates a rotary piston combustion engine in a cross-sectional schematic way.

DESCRIPTION OF THE PREFERRED EMBODIMENTS

The rotary piston combustion engine illustrated consists of a housing with a jacket 1, which has an inner contour 2 in the shape of a dual-arc epitrochoid and bounds an inner chamber 3 through which an eccentric shaft 4 with eccentric 5 passes. A triangular piston 6 is rotatably mounted on the eccentric 5. The piston, as it rotates in the direction of the arrow D, constantly slides with its edges 7 along the inner contour 2, whereby the operating chambers A, B and C with various volumes form, and in which a complete four-stroke process takes place with an appropriate phase shift. To permit this to be accomplished the jacket 1 has an inlet channel 8 for the entry of fresh gas, two spark plugs 9 and 10, as well as an exit channel 11 for the expulsion of exhaust gases. Each operating chamber A, B, C sequentially executes an aspiration, compression, expansion, and expulsion step as the piston 6 rotates, whereby in the position of the piston 6 shown in the drawing, the operating chamber A is in the aspiration step, the operating chamber B is in the compression step, and the operating chamber C is at the end of the expansion step. The position X, drawn with dotted line, is assumed by the piston 6 generally when the compression step is completed and the expansion step begins after ignition of the spark plug 9 and/or 10. The two spark plugs 9 and 10 are mounted sequentially along the rotation direction of the piston 6, illustrated by the arrow D, whereby the spark plug 9 (in minus position) is mounted before the short axis 12 within the dual arc inner contour 2, and the spark plug 10 (in plus position) is mounted immediately after said short axis. The spark plug 9 is connected to the secondary winding of an ignition coil 13, of which the primary winding is connected conventionally to an ignition control circuit 14. This part of the ignition system, equipped with a coil ignition unit, creates a long spark tail which is particularly favorable for idling. It may also be operated with a magneto ignition unit or in conjunction with electronic components in the form of a transistor or triggered-sequence ignition unit. The spark plug 10 in this embodiment is connected to a high-voltage capacitor ignition system 15 which is particularly suitable for good cold-starting of the engine. This ignition system in turn is connected to its own ignition control circuit 16. However, the two different ignition systems may also be controlled by a common ignition control circuit shown by a box with dashed lines (17).

In this embodiment, various types of ignition system were used in combination. They provide a long spark trail which is required for complete inflammability of the gases and also an effective voltage rise speed.

However, the invention is not restricted to the illustrated embodiment. More than two spark plugs may be used, and the spark plug need not be mounted sequentially in the jacket 1; they may also be mounted adjacently. It is also conceivable, for example, to replace the high-voltage capacitor ignition system 15 by another conventional ignition system such as a coil system, a magneto system, a transistor system, or a triggered-sequence system. However, in such cases the ignition coil 13 is also replaced with a different ignition system.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. An ignition system for a four-stroke rotary piston combustion engine of the trochoid type comprising: a casing having an inner chamber bounded by a jacket with dual arc inside contour through which an eccentric shaft with an eccentric passes, a triangular piston rotatably mounted on said eccentric shaft, at least two spark plugs fitted in the jacket near the short axis, each spark plug being connected to its own ignition generator in an ignition system, and different ignition systems for the individual spark plugs, the spark plugs being mounted before and after the short axis along the rotational direction of the piston, the spark plug mounted before the short axis being connected to an ignition system that creates a long spark tail and the spark plug mounted after the short axis being connected to an ignition system that creates a high voltage rise speed.

2. An ignition system for a four-stroke rotary piston combustion engine of the trochoid type comprising; a casing having an inner chamber bounded by a jacket with dual arc inside contour through which an eccentric shaft with an eccentric passes, a triangular piston rotatably mounted on said eccentric shaft, at least two spark plugs fitted in the jacket near the short axis, each spark plug being connected to its own ignition generator in an ignition system, and different ignition systems for the individual spark plugs, the spark plugs being mounted sequentially along the rotation direction of the piston, the first spark plug mounted before the short axis along the rotational direction of the piston and being connected to a conventional coil ignition system, and the second spark plug being mounted after the short axis and being connected to a conventional high voltage capacitor ignition system.

3. An ignition system for a four-stroke rotary piston combustion engine of the trochoid type comprising; a casing having an inner chamber bounded by a jacket with dual arc inside contour through which an eccentric shaft with an eccentric passes, a triangular piston rotatably mounted on said eccentric shaft, at least two spark plugs fitted in the jacket near the short axis, each spark plug being connected to its own ignition generator in an ignition system, and different ignition systems for the individual spark plugs, two spark plugs being mounted sequentially along the rotational direction of the piston, the first spark plug being mounted before the short axis along the rotation direction of the piston and being connected to a conventional transistor ignition system, and the second spark plug being mounted after the short axis and being connected to a high voltage capacitor ignition system.

4. An ignition system for a four-stroke rotary piston combustion engine of the trochoid type comprising; a casing having an inner chamber bounded by a jacket with dual arc inside contour through which an eccentric shaft with an eccentric passes, a triangular piston rotatably mounted on said eccentric shaft, at least two spark plugs fitted in the jacket near the short axis, each spark plug being connected to its own ignition generator in an ignition system, and different ignition systems for the individual spark plugs, two spark plugs being mounted sequentially along the rotational direction of the piston, the first spark plug being mounted before the short axis along the rotation direction of the piston and being connected to a conventional magneto ignition system, and the second spark plug being mounted after the short axis and being connected to a high voltage capacitor ignition system.

* * * * *